US009669572B2

(12) United States Patent
Chen

(10) Patent No.: US 9,669,572 B2
(45) Date of Patent: Jun. 6, 2017

(54) METHOD FOR MOLDING A DECORATIVE ZIPPER PULL AND MOLD FOR A ZIPPER PULL

(71) Applicant: Duraflex Hong Kong Limited, Sheung Wan (HK)

(72) Inventor: Te Chien Chen, Tsuen Wan (HK)

(73) Assignee: Duraflex Hong Kong Limited, Sheung Wan (HK)

( * ) Notice: Subject to any disclaimer, the term of this patent is extended or adjusted under 35 U.S.C. 154(b) by 589 days.

(21) Appl. No.: 14/175,022

(22) Filed: Feb. 7, 2014

(65) Prior Publication Data
US 2015/0224690 A1   Aug. 13, 2015

(51) Int. Cl.
*B29C 45/14*   (2006.01)
*B29C 45/16*   (2006.01)
*B29L 5/00*   (2006.01)
*A44B 19/26*   (2006.01)

(52) U.S. Cl.
CPC .... *B29C 45/1675* (2013.01); *B29C 45/14426* (2013.01); *B29C 45/1671* (2013.01); *A44B 19/262* (2013.01); *B29C 2045/14122* (2013.01); *B29C 2045/14139* (2013.01); *B29L 2005/00* (2013.01)

(58) Field of Classification Search
CPC .......... B29C 45/1675; B29C 45/14426; B29C 2045/14122; B29C 2045/14139; B29C 45/1671; B29L 2005/00; A44B 19/262
See application file for complete search history.

(56) References Cited

U.S. PATENT DOCUMENTS

| 4,440,377 | A | * | 4/1984 | Hujik | B29C 33/26 249/110 |
|---|---|---|---|---|---|
| 6,183,681 | B1 | * | 2/2001 | Sullivan | B29C 33/14 264/245 |
| D476,598 | S | | 7/2003 | Yang | |
| 6,617,543 | B1 | | 9/2003 | Yang | |
| 6,986,858 | B2 | | 1/2006 | Yang | |
| 2004/0034974 | A1 | * | 2/2004 | Arai | A44B 19/262 24/429 |
| 2005/0022347 | A1 | * | 2/2005 | Yang | A44B 19/262 24/429 |

OTHER PUBLICATIONS

Derwent abstract and figure of Chinese application 103737815 A dated Apr. 23, 2014.*

* cited by examiner

*Primary Examiner* — Robert B Davis
(74) *Attorney, Agent, or Firm* — Collard & Roe, P.C.

(57) ABSTRACT

A molding process for creating a decorative pull has two separate molding steps. In the first molding step, a first top mold portion, and a bottom mold portion are used. The bottom mold portion has a mold compartment with an indentation in the bottom. An end of a soft string is placed in this compartment with the end disposed over the indentation. The first top mold portion is closed over the bottom mold portion and molding material is injected. The molding material enters the mold cavity and flows into the indentation to cover the ends of the string entirely, to create a first molded component. A second top mold portion is then placed over the bottom mold potion and molding material is then injected into the second mold cavity formed by the second top mold portion to cover the first molded component and create a molded pull for use on zippers or other items.

12 Claims, 5 Drawing Sheets

METHOD FOR MOLDING A DECORATIVE ZIPPER PULL AND MOLD FOR A ZIPPER PULL

BACKGROUND OF THE INVENTION

1. Field of the Invention

The present invention relates to a method for molding a decorative pull. In particular, the invention relates to a method for molding a decorative pull for zippers or other items, using a two-step molding process.

2. The Prior Art

Decorative pulls are tabs that are attached to strings and then attached to a zipper or other item, usually on a jacket or other garment, or on luggage, backpacks, etc. The pull aids in moving the zipper or other item and can act as a decorative embellishment to the garment as well.

Pulls are traditionally made of a plastic material that is molded around a string. In order to keep the pull thin and not bulky, a three-step molding process can be used, such as described in U.S. Pat. No. 6,986,858.

SUMMARY OF THE INVENTION

It would be desirable to provide an improved and simplified method for molding a pull, in which the string is prevented from moving during the molding process and in which the string is securely molded within the molding material.

These and other objects are accomplished by a molding process using two separate molding steps. In the first molding step, a first top mold portion and a bottom mold portion are used. The first top and the bottom mold portions form a first mold cavity. The bottom mold portion has two side walls, an end wall and an indentation adjacent the end wall. The side walls and end wall form a compartment in the mold. At least one end of a soft string is placed in this compartment with the end or ends disposed on top of the indentation. Preferably, the string is placed so that the end of the string extends over the indentation by a length that is equal to the diameter of the string. The indentation can be molded based on the type of string, so that the length of the indentation is preferably two times the diameter of the string. This way, the string extends exactly half-way into the length of the indentation.

The first top mold portion is then closed over the bottom mold portion and molding material is injected into the first mold cavity. During this molding process, the molding material enters the first mold cavity and flows into the indentation to cover the ends of the string entirely, to create a first molded component. The first top mold portion is then removed and a second top mold portion is placed over the bottom mold portion. The second top mold portion has a second mold cavity that surrounds the first molded component. Molding material is then injected into the second mold cavity in a second molding step to create a finished molded pull. In a final step, second top mold portion is removed and the molded pull is removed from the bottom mold portion. The molding material in the two molding steps can be the same material, or two different materials. The molding material can be any suitable plastic material, and can be opaque, translucent or transparent. With translucent and transparent pulls, securing of the string is of high importance, so that the ends of the string remain exactly in a designated position, which is normally in the center of the mold during molding. The process of the present invention prevents any migration of the string ends during molding, so that each pull is substantially identical in appearance.

In one embodiment, the molding material is injected into the first mold cavity via a sprue that is located just above a mold break between the first top portion and the bottom mold portion. The string is positioned so that the thickness of the string spans the mold break and the sprue is located level with the string during molding. This way, the molding material is injected at the same level as the string and can easily flow below and above the string to create the first molded component. As the molding material is injected, it flows around all sides of the end of the string to completely cover the ends of the string that are over the indentation. The portion of the string that is not over the indentation is not covered on one side, as it is pressed against the mold when the mold is closed. The sprue can be any shape. One suitable shape for the sprue is rectangular.

Preferably, the bottom portion of the first mold has a bottom surface with a W-shaped or similarly shaped cross-section having two grooves for holding the individual strands of string during molding. The grooves themselves can take on any particular shape, such as rounded or triangular. This way, the two ends of the string rest in each of the grooves of the bottom surface, and are prevented from any lateral movement during molding. This way each molded component can be assured to be consistent. This reduces errors and waste during the molding process, as many products are molded at once. As stated above, this is especially important when molding translucent or transparent pulls, because migration of the string during molding adversely affects the appearance of the product. Alternatively, if a single strand is being used, a bottom surface having a single U-shaped groove can be used.

In order to further stabilize the string during molding, there can be additional holder elements outside of the compartment for holding the string in place in the bottom mold portion. The holder elements can be protrusions extending upward on either side of the string to prevent lateral movement of the string during molding.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the invention.

In the drawings, wherein similar reference characters denote similar elements throughout the several views.

DETAILED DESCRIPTION OF THE PREFERRED EMBODIMENT

Figure 1:
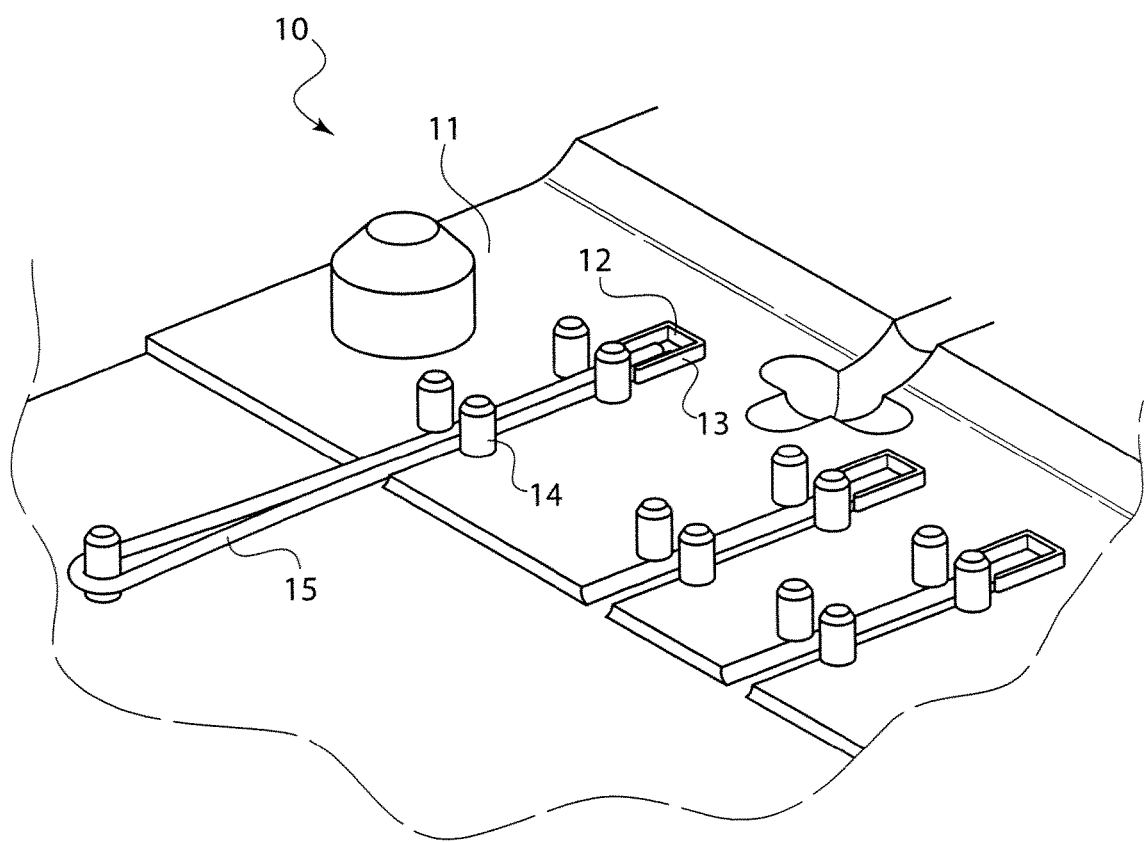
FIG. 1 shows a partial view of a bottom portion of the mold according to the invention.
Figure 2:
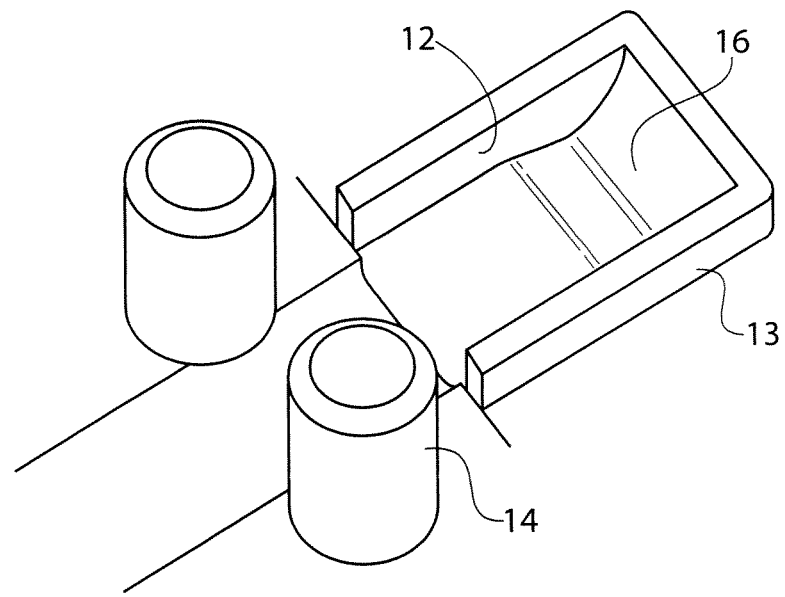
FIG. 2 shows the bottom portion of the mold.
Figure 3:
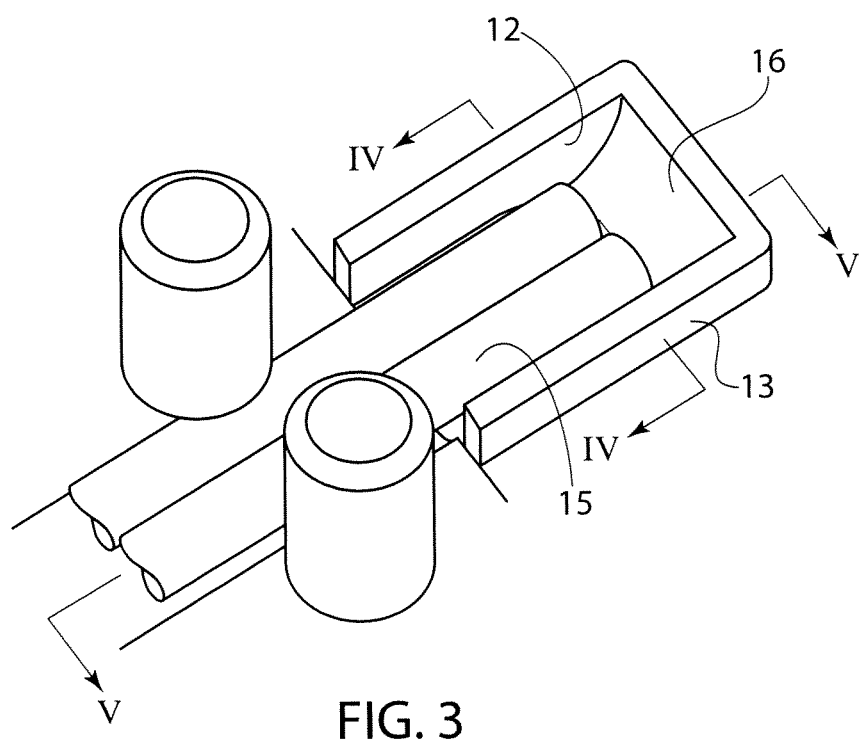
FIG. 3 shows the molding cavity of FIG. 2 with a string placed in the cavity.

Referring now in detail to the drawings, FIG. 1 shows the bottom portion 11 of a first mold 10. First mold 10 has a plurality of lower molding cavities 12 surrounded by side walls 13. In addition, string stabilizers 14 are positioned at various points around bottom portion 10 to keep string 15 from moving during the molding process. FIG. 2 shows an enlarged view of lower mold cavity 12, in which a rounded indentation 16 is formed at the end of lower mold cavity 12. As shown in FIG. 3, the ends of string 15 overlap indentation 16 when string 15 is placed in lower mold cavity 12.

Figure 5:
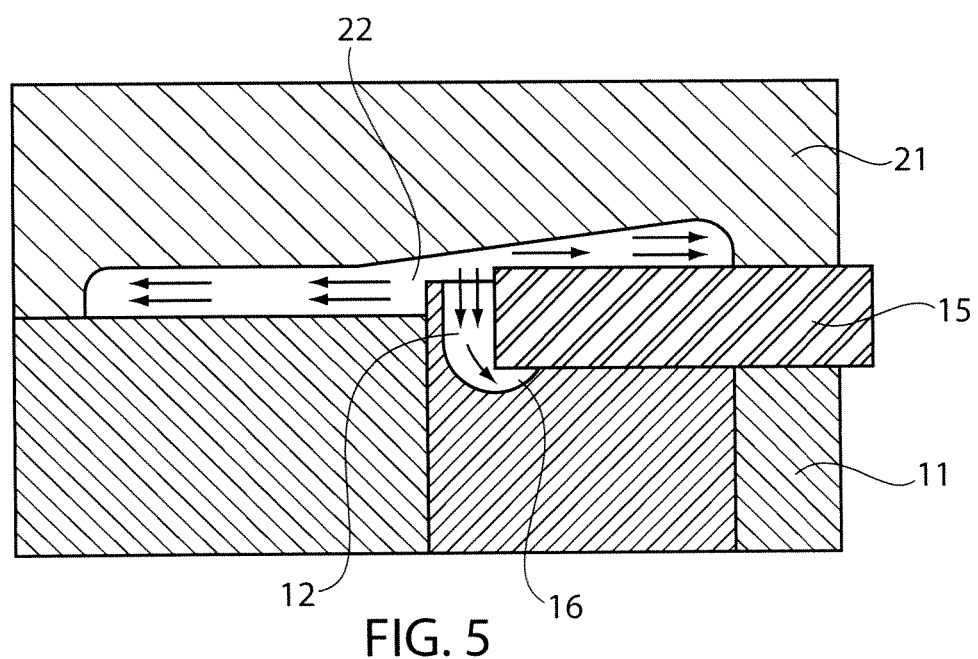
FIG. 5 shows another cross-sectional view of the first molding process along lines V-V of FIG. 3.

Once string 15 is place in mold cavity 12, bottom mold portion 11 is covered by a top mold portion 21, and plastic is injected into the closed mold, to flow into lower mold cavity 12 and upper mold cavity 22 via a sprue 23. Arrows 30 indicate the flow pattern of the plastic around the lower and upper mold cavities 12, 22. As shown in FIG. 5, the plastic flows around the ends of string 15 to enter indentation 16 so as to completely cover the ends of string 15.

Figure 4:
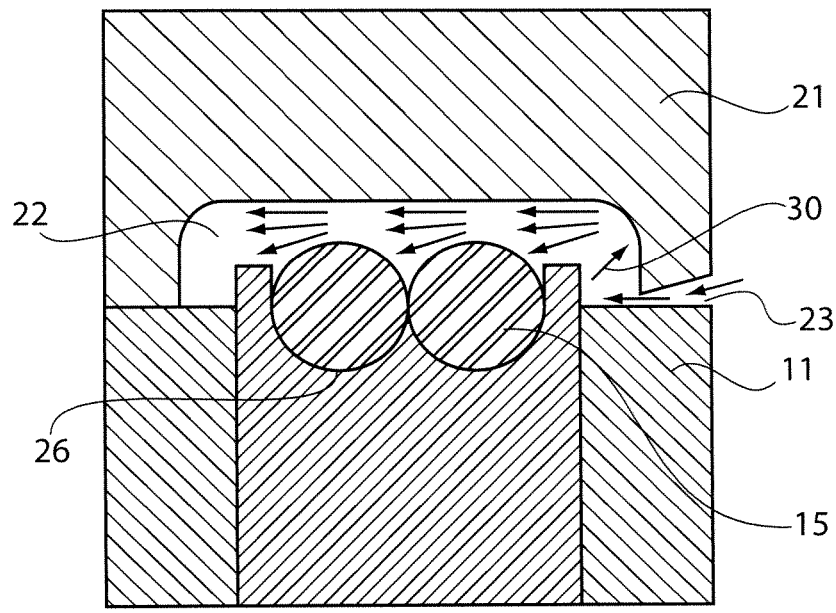
FIG. 4 shows a cross-sectional view of the first molding process in the along lines IV-IV of FIG. 3.
Figure 6:
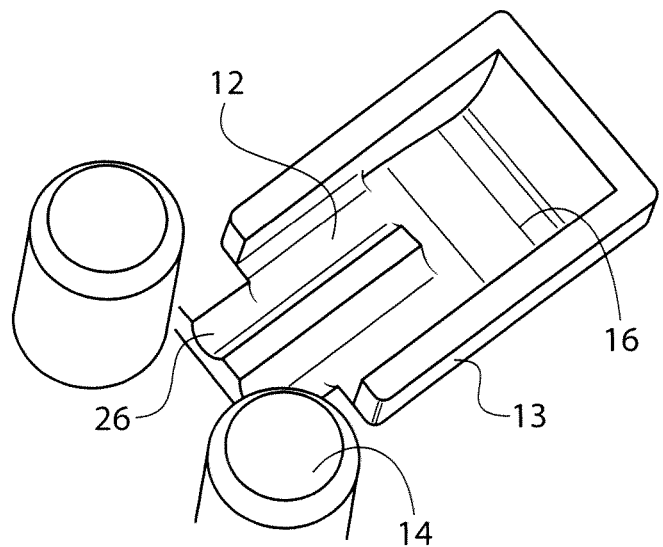
FIG. 6 shows another embodiment of the bottom mold portion.
Figure 7:
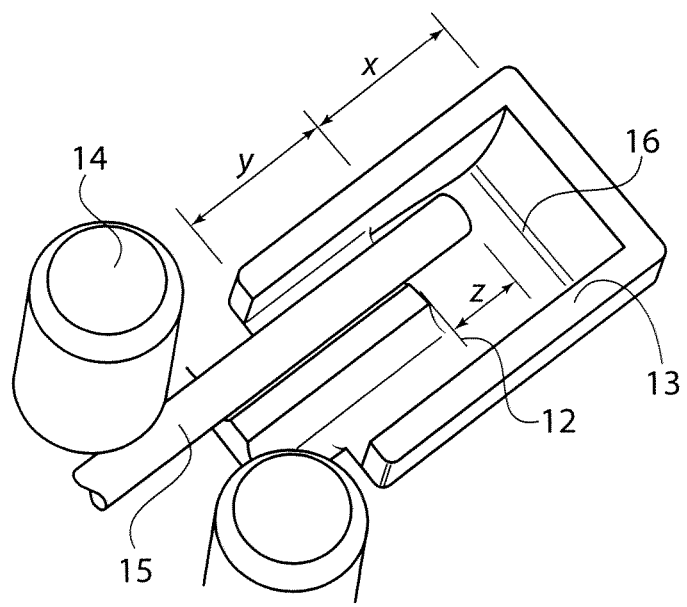
FIG. 7 shows the embodiment of FIG. 6 with a string placed thereon.

In an alternative embodiment as shown in FIGS. 6 and 7, lower mold cavity 12 can be formed with rounded sections 26, forming a W-shape, for securely positioning string 15 in lower mold portion 11 prior to and during the molding process. The cross-section of this W-shape is shown in FIG. 4. Preferably, the lengthwise portion of string 15 that extends into the indentation 16 is equal to a diameter z of the string 15, and the length x of the indentation is equal to twice the diameter of the string (2z). Length x is preferably at least 2 mm. Length y is the length of the grooves that hold the string. The length x+y of the entire compartment 12 is equal to at least four times the diameter of the string 15.

Figure 8:
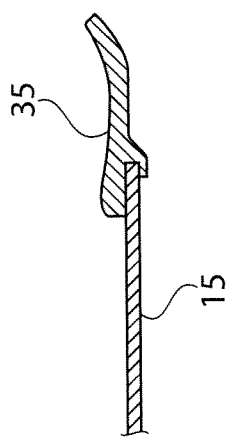
FIG. 8 shows a cross-sectional view of the pull after being molded in the first molding step.

After the first molding process is completed, a first pull component 35 results, as shown in FIG. 8. First pull component 35 has string 15 completely covered on its ends.

Figure 9:
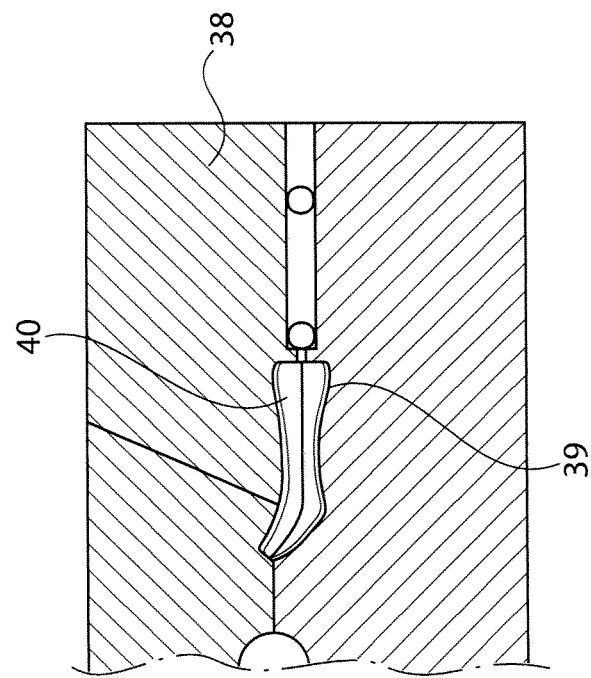
FIG. 9 shows a cross-sectional view of the pull after being molded in the second molding step.
Figure 10:
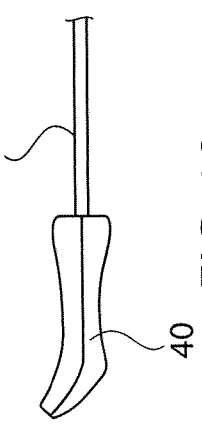
FIG. 10 shows a side view of a finished pull.

First pull component 35 is then molded again by removing top mold portion 21 and replacing it with a second top mold portion 38 having a second mold cavity 39. Plastic is then injected into second mold cavity 39 in a second molding step to create a fully finished pull 40, as shown in FIGS. 9 and 10.

The finished pull 40, due to the particular molding steps discussed above, can be manufactured very thin, yet securely holds string 15 in place. The particular configuration of the lower mold cavity 12 in the first mold ensures that the string does not move during the molding process, thus manufacturing defects are minimized. String stabilizers 14 and rounded sections 26 securely hold string 15 in place during the molding process, and indentation 16 allows the plastic to completely encase the ends of the string during the first molding process. This encasement prevents any additional movement of the string during the second molding process and keeps string 15 more securely connected to zipper pull 40. With the process of the present invention, identical translucent zipper pulls can be manufactured without any substantial variation in their appearance, because the string is kept immobile during the molding process.

Accordingly, while only a few embodiments of the present invention have been shown and described, it is obvious that many changes and modifications may be made thereunto without departing from the spirit and scope of the invention.

What is claimed is:

1. A method for molding a decorative zipper pull, comprising:
    providing a first top mold portion and a bottom mold portion, the first top and bottom mold portions forming a first mold cavity, wherein the bottom mold portion has two side walls, an end wall and an indentation adjacent the end wall;
    placing at least one end of a string in the first mold cavity, such that said at least one end is disposed directly above the indentation;
    closing first top mold portion over the bottom mold portion;
    injecting molding material into the first mold cavity such that the molding material enters the first mold cavity and flows into the indentation to cover the at least one end of the string entirely, to create a first molded component;
    removing the first top mold portion;
    placing a second top mold portion having a second mold cavity over the bottom mold portion;
    injecting molding material into the second mold cavity to create a molded pull; and
    removing the molded pull from the mold portions, wherein the molding material is injected into the first mold via a sprue that is located just above a mold break between the first top and bottom mold portions, and wherein the sprue is located at a same level as the string during molding.

2. The method according to claim 1, wherein the indentation is rounded.

3. The method according to claim 1, wherein the string extends into the indentation by a length equal to a diameter of the string, and the length of the indentation is equal to double the diameter of the string.

4. The method according to claim 1, wherein the mold material in both molding steps is translucent or transparent.

5. The method according to claim 1, wherein the bottom mold portion of has a bottom surface with a W-shaped cross-section containing grooves for holding the string during molding.

6. The method according to claim 5, wherein the grooves have a rounded cross-section.

7. A molding assembly for molding a decorative pull, comprising:
    a first top mold portion,
    a bottom mold portion, with a mold cavity being formed by the top and bottom mold portions when the first top mold portion is closed over the bottom mold portion, wherein a bottom surface of the bottom mold portion has side walls and an end wall forming a compartment for receiving ends of a string, wherein the compartment has a W-shaped bottom having grooves for receiving two string ends and wherein said bottom surface adjacent the end wall has an indentation,
    wherein when a string is placed in the compartment with the ends of the string positioned above the indentation, and molding material is injected into the mold cavity, the molding material flows into the indentation around the string and entirely covers the ends of the string, and
    a second top mold portion having a second mold cavity, said second top mold portion being configured such that a molded article formed by the first top mold portion and the bottom mold portion be molded in a second step by replacing the first top mold portion with the second top mold portion and injecting additional molding material to create a finished decorative pull.

8. The molding assembly according to claim 7, wherein the grooves have a rounded cross-section.

9. A molding assembly for molding a decorative pull, comprising:
   a first top mold portion,
   a bottom mold portion, with a mold cavity being formed by the top and bottom mold portions when the first top mold portion is closed over the bottom mold portion, wherein a bottom surface of the bottom mold portion has side walls and an end wall forming a compartment for receiving ends of a string and wherein said bottom surface adjacent the end wall has an indentation,
   wherein when a string is placed in the compartment with the ends of the string positioned above the indentation, and molding material is injected into the mold cavity, the molding material flows into the indentation around the string and entirely covers the ends of the string, and
   a second top mold portion having a second mold cavity, said second top mold portion being configured such that a molded article formed by the first top mold portion and the bottom portion be molded in a second step by replacing the first top mold portion with the second top mold portion and injecting additional molding material to create a finished decorative pull, wherein the first top mold potion has a sprue located adjacent a mold break between the first top and bottom mold portions, said sprue being located level with the string when the string is placed in the compartment.

10. The molding assembly according to claim 9, wherein the sprue is rectangular in shape.

11. The molding assembly according to claim 7, further comprising holder elements outside of the compartment for holding the string in place in the bottom mold portion.

12. The molding assembly according to claim 7, wherein the indentation is rounded.

* * * * *